(12) United States Patent
Zhou

(10) Patent No.: US 11,621,014 B2
(45) Date of Patent: Apr. 4, 2023

(54) AUDIO PROCESSING METHOD AND APPARATUS

(71) Applicant: Apollo Intelligent Connectivity (Beijing) Technology Co., Ltd., Beijing (CN)

(72) Inventor: Xingjie Zhou, Beijing (CN)

(73) Assignee: Apollo Intelligent Connectivity (Beijing) Technology Co., Ltd., Beijing (CN)

(*) Notice: Subject to any disclaimer, the term of this patent is extended or adjusted under 35 U.S.C. 154(b) by 181 days.

(21) Appl. No.: 16/668,087

(22) Filed: Oct. 30, 2019

(65) Prior Publication Data

US 2020/0143800 A1 May 7, 2020

(30) Foreign Application Priority Data

Nov. 1, 2018 (CN) .......................... 201811296970.5

(51) Int. Cl.
*G10L 21/0208* (2013.01)
*G10L 15/20* (2006.01)
(Continued)

(52) U.S. Cl.
CPC .......... *G10L 21/0208* (2013.01); *G10L 15/20* (2013.01); *G10L 15/22* (2013.01);
(Continued)

(58) Field of Classification Search
CPC ..... G10L 21/0208; G10L 15/20; G10L 15/22; G10L 21/0232; G10L 21/0364; G10L 25/81; G10L 2015/223
See application file for complete search history.

(56) References Cited

U.S. PATENT DOCUMENTS 6,266,422 B1* 7/2001 Ikeda .................. G10L 21/0208
381/94.1
9,691,378 B1* 6/2017 Meyers ................. G10L 21/028
(Continued)

FOREIGN PATENT DOCUMENTS

CN 103312913 A 9/2013
CN 106910510 A 6/2017
(Continued)

OTHER PUBLICATIONS

First Office Action of priority Chinese patent application No. 201811296970.5 dated Jun. 25, 2021, seven pages.

*Primary Examiner* — Mohammad K Islam
(74) *Attorney, Agent, or Firm* — Harness, Dickey & Pierce, P.L.C.

(57) ABSTRACT

Embodiments of the present application provide an audio processing method and an apparatus. The method includes: a mobile terminal and a vehicle terminal are in a connected state, and playing, by the mobile terminal, a first audio synchronously with the vehicle terminal; obtaining, by the mobile terminal, a recorded audio of a current environment, where the recorded audio includes the first audio played by the vehicle terminal and a second audio for voice recognition; and eliminating, according to the first audio played by the mobile terminal, the first audio played by the vehicle terminal in the recorded audio to obtain the second audio. In the embodiments of the present application, by playing the first audio synchronously by the mobile terminal and the vehicle terminal, the second audio for voice recognition in the recorded audio can be obtained according to the first audio played by the mobile terminal.

5 Claims, 3 Drawing Sheets

Playing a first audio synchronously with a vehicle terminal, where an amplitude corresponding to the first audio when being played by a mobile terminal is 0 — S101

Obtaining a recorded audio of a current environment, where the recorded audio includes the first audio played by the vehicle terminal and a second audio for voice recognition — S102

Eliminating, according to the first audio played by the mobile terminal, the first audio played by the vehicle terminal in the recorded audio to obtain the second audio — S103

(51) Int. Cl.
  *G10L 15/22* (2006.01)
  *G10L 21/0232* (2013.01)
  *G10L 25/81* (2013.01)
  *G10L 21/0364* (2013.01)

(52) U.S. Cl.
  CPC ...... *G10L 21/0232* (2013.01); *G10L 21/0364* (2013.01); *G10L 25/81* (2013.01); *G10L 2015/223* (2013.01)

(56) References Cited

U.S. PATENT DOCUMENTS

| | | | |
|---|---|---|---|
| 9,881,632 B1 | 1/2018 | Every | |
| 11,017,799 B2 | 5/2021 | Song | |
| 2004/0143433 A1* | 7/2004 | Marumoto | H03G 3/32 704/E21.009 |
| 2011/0071821 A1* | 3/2011 | Konchitsky | H04R 3/005 704/226 |
| 2016/0036962 A1* | 2/2016 | Rand | H04W 76/25 455/418 |
| 2016/0098989 A1* | 4/2016 | Layton | G10L 21/0208 704/233 |
| 2017/0235543 A1* | 8/2017 | England | G10L 19/0017 700/94 |
| 2018/0096678 A1* | 4/2018 | Zhou | G10L 15/32 |
| 2019/0096429 A1* | 3/2019 | Kovvali | G01S 3/8006 |
| 2020/0045166 A1* | 2/2020 | Furuta | H04M 3/002 |
| 2020/0135224 A1* | 4/2020 | Bromand | H04M 9/08 |

FOREIGN PATENT DOCUMENTS

| | | |
|---|---|---|
| CN | 107452396 A | 12/2017 |
| CN | 108022591 A | 5/2018 |
| CN | 108091341 A | 5/2018 |

\* cited by examiner

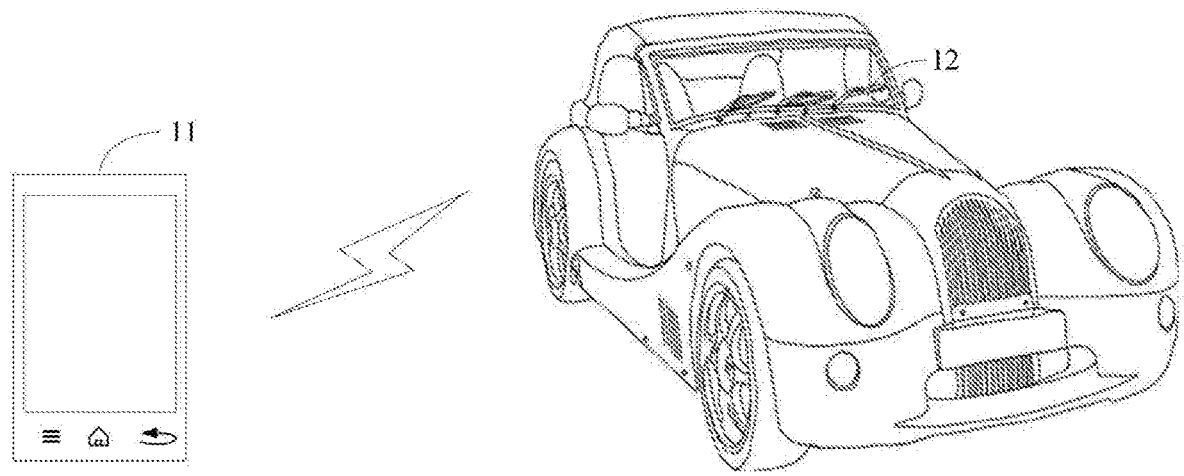

FIG. 1

| Playing a first audio synchronously with a vehicle terminal, where an amplitude corresponding to the first audio when being played by a mobile terminal is 0 | S101 |

| Obtaining a recorded audio of a current environment, where the recorded audio includes the first audio played by the vehicle terminal and a second audio for voice recognition | S102 |

| Eliminating, according to the first audio played by the mobile terminal, the first audio played by the vehicle terminal in the recorded audio to obtain the second audio | S103 |

FIG. 2

AUDIO PROCESSING METHOD AND APPARATUS

CROSS-REFERENCE TO RELATED APPLICATION

This application claims priority to Chinese Patent Application No. 201811296970.5, filed on Nov. 1, 2018, which is hereby incorporated by reference in its entirety.

TECHNICAL FIELD

Embodiments of the present disclosure relate to the field of terminal technologies, and in particular, to an audio processing method and an apparatus.

BACKGROUND

When a user drives a car, the user can connect a mobile terminal with a vehicle terminal. If the user operates the mobile terminal to play music, the music is actually played by the vehicle terminal, so as to achieve the purpose of listening to music.

However, in this way, there is a sound of music in an environment in which the user is currently located. If the user controls the mobile terminal to control an application through voice, a recording of the mobile terminal may include both the sound of the music and a voice of the user. Due to an interference of a sound such as music, a probability that the mobile terminal can recognize, according to the recording, the voice of the user to control the application is low.

SUMMARY

The embodiments of the present application provide an audio processing method and an apparatus, which improve a probability that a terminal recognizes a voice of a user.

In a first aspect, an embodiment of the present application provides an audio processing method, where a mobile terminal and a vehicle terminal are in a connected state, the method is applied to the mobile terminal, and the method includes:

playing a first audio synchronously with the vehicle terminal, where an amplitude corresponding to the first audio when being played by the mobile terminal is 0;

obtaining a recorded audio of a current environment, where the recorded audio includes the first audio played by the vehicle terminal and a second audio for voice recognition; and eliminating, according to the first audio played by the mobile terminal, the first audio played by the vehicle terminal in the recorded audio to obtain the second audio.

In a possible design, before the playing a first audio synchronously with the vehicle terminal, the method further includes:

caching the first audio locally.

In a possible design, the eliminating, according to the first audio played by the mobile terminal, the first audio played by the vehicle terminal in the recorded audio to obtain the second audio includes:

performing a resampling processing on the first audio played by the mobile terminal to obtain a third audio; and eliminating, according to the third audio, the first audio played by the vehicle terminal in the recorded audio to obtain the second audio.

In a possible design, the eliminating, according to the third audio, the first audio played by the vehicle terminal in the recorded audio to obtain the second audio includes:

eliminating the first audio played by the vehicle terminal in the recorded audio to obtain the second audio by taking the third audio as a reference audio.

In a possible design, the eliminating, according to the first audio played by the mobile terminal, the first audio played by the vehicle terminal in the recorded audio to obtain the second audio includes:

performing a dual channel to single channel processing on the third audio to obtain a fourth audio; and eliminating, according to the fourth audio, the first audio played by the vehicle terminal in the recorded audio to obtain the second audio.

In a possible design, the eliminating, according to the fourth audio, the first audio played by the vehicle terminal in the recorded audio to obtain the second audio includes:

eliminating the first audio played by the vehicle terminal in the recorded audio to obtain the second audio by taking the fourth audio as a reference audio.

In a second aspect, an embodiment of the present application provides an audio processing apparatus, where the audio processing apparatus and a vehicle terminal are in a connected state, and the apparatus includes:

a playing module, configured to play a first audio synchronously with the vehicle terminal, where an amplitude corresponding to the first audio when being played by the audio processing apparatus is 0;

an obtaining module, configured to obtain a recorded audio of a current environment, where the recorded audio includes the first audio played by the vehicle terminal and a second audio for voice recognition; and an eliminating module, configured to eliminate, according to the first audio played by the audio processing apparatus, the first audio played by the vehicle terminal in the recorded audio to obtain the second audio.

In a possible design, the apparatus further includes: a caching module;

the caching module is configured to cache the first audio locally before playing the first audio synchronously with the vehicle terminal.

In a possible design, the eliminating module is specifically configured to:

perform a resampling processing on the first audio played by the audio processing apparatus to obtain a third audio; and eliminate, according to the third audio, the first audio played by the vehicle terminal in the recorded audio to obtain the second audio.

In a possible design, the eliminating module is specifically configured to:

eliminate the first audio played by the vehicle terminal in the recorded audio to obtain the second audio by taking the third audio as a reference audio.

In a possible design, the eliminating module is specifically configured to:

perform a dual channel to single channel processing on the third audio to obtain a fourth audio; and eliminate, according to the fourth audio, the first audio played by the vehicle terminal in the recorded audio to obtain the second audio.

In a possible design, the eliminating module is specifically configured to:

eliminate the first audio played by the vehicle terminal in the recorded audio to obtain the second audio by taking the fourth audio as a reference audio.

In a third aspect, an embodiment of the present application provides a readable storage medium, including a program or an instruction, where the method according to the first aspect and any possible design of the first aspect is executed when the program or the instruction is operated on a computer.

In a fourth aspect, an embodiment of the present application provides a terminal, including a processor coupled to a memory;

the memory is configured to store a computer program; and the processor is configured to invoke the computer program stored in the memory to implement the method according to the first aspect and any possible design of the first aspect.

In the present application, by playing the first audio synchronously by the mobile terminal and the vehicle terminal, the second audio for voice recognition can be obtained by eliminating, according to the first audio played by the mobile terminal, the first audio played by the vehicle terminal in the recorded audio, thereby improving the probability that the mobile terminal recognizes the voice of the user.

BRIEF DESCRIPTION OF DRAWINGS

In order to illustrate the embodiments of the present application or the technical solutions in the prior art clearer, the accompanying drawings used in the description of the embodiments or the prior art will be briefly illustrated below. Obviously, the accompanying drawings in the following description are some embodiments of the present application, and other accompanying drawings can be obtained by those skilled in the art according to the accompanying drawings without any creative work.

FIG. 1 is an application scenario diagram according to an embodiment of the present application;

FIG. 2 is a flowchart of an audio processing method according to an embodiment of the present application;

DESCRIPTION OF EMBODIMENTS

Figure 3:
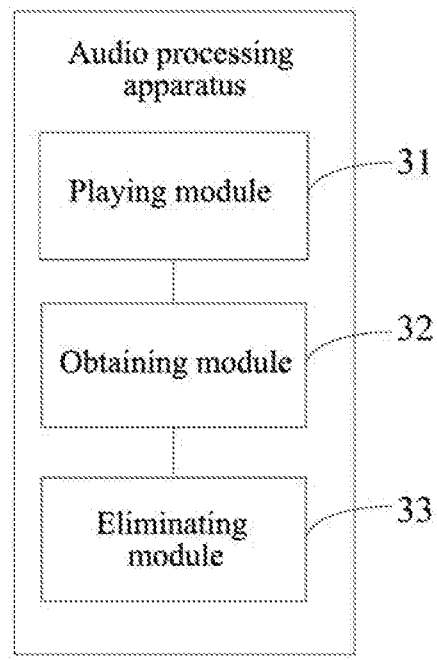
FIG. 3 is a first schematic structural diagram of an audio processing apparatus according to an embodiment of the present application.

In order to make the purpose, technical solutions and advantages of the embodiments of the present disclosure clearer, the technical solutions of the embodiments of the present disclosure will be clearly and completely described below with reference to the accompanying drawings in the embodiments of the present disclosure. Apparently, the described embodiments are part of the embodiments of the present application, rather than all of the embodiments. On the basis of the embodiments of the present application, all other embodiments obtained by those skilled in the art without creative work fall within the protection scope of the present application.

In the present application, "at least one" means one or more, and "a plurality of" means two or more. "And/or" describes the association relationship of the associated objects, which indicates that there can be three relationships. For example, A and/or B can indicate that A exists separately, A and B exist at the same time, and B exists separately, where A and B can be singular or plural. The character "/" generally indicates that the contextual objects are an "or" relationship. "At least one of the following" or a similar expression thereof refers to any combination of these items, including any combination of a single item or a plurality of items. For example, at least one of a, b, or c can represents: a, b, c, a and b, a and c, b and c, or a, b and c, where a, b, and c may be single or multiple. In the present application, the terms "first", "second", and the like, are used to distinguish similar objects, and are not necessarily used to describe a particular order or a sequence.

FIG. 1 is an application scenario diagram according to an embodiment of the present application. Referring to FIG. 1, a mobile terminal 11 and a vehicle terminal 12 are in a connected state.

Specifically, the mobile terminal 11 plays a first audio synchronously with the vehicle terminal, where an amplitude corresponding to the first audio when being played by the mobile terminal is 0; the mobile terminal 11 obtains a recorded audio of a current environment in real time, where the recorded audio includes the first audio played by the vehicle terminal 12 and a second audio for voice recognition; and the mobile terminal 11 eliminates, according to the first audio played by the mobile terminal 11, the first audio played by the vehicle terminal in the recorded audio to obtain the second audio.

In this way, the first audio is played synchronously by the mobile terminal and the vehicle terminal, if the user is controlling an application of the mobile terminal by voice, the first audio played by the vehicle terminal 12 in the recorded audio can be eliminated, and the probability that the mobile terminal 11 recognizes the second audio which is used for voice recognition in the recorded audio is relatively high. That is, in the application scenario, a probability that the user effectively controls the application of the mobile terminal by voice is improved.

The technical solutions shown in the present application are described in detail by means of specific embodiments in the following with reference to the present application scenarios described above. It should be noted that the following specific embodiments may be combined with each other, and the same or similar contents will not be repeatedly described in different embodiments.

FIG. 2 is a flowchart of an audio processing method according to an embodiment of the present application. The method in this embodiment includes steps S101 to S103. An execution entity of this embodiment can be the mobile terminal in FIG. 1. Referring to FIG. 2, the method of this embodiment includes:

step S101: playing a first audio synchronously with a vehicle terminal, where an amplitude corresponding to the first audio when being played by the mobile terminal is 0.

Specifically, in a state where the mobile terminal is connected to the vehicle terminal, the mobile terminal transmits the first audio to the vehicle terminal for playing. When the first audio is played by the vehicle terminal, there is a sound in an environment.

In the state where the mobile terminal is connected to the vehicle terminal, while the mobile terminal transmits the first audio to the vehicle terminal for playing, the mobile terminal also caches the first audio locally (in the mobile terminal) to implement the mobile terminal synchronously plays the first audio while the mobile terminal plays the first audio in the vehicle terminal.

Exemplarily, if a user intends to control the vehicle terminal to play an A song by the mobile terminal, the mobile terminal transmits an audio of the A song to the vehicle terminal for playing, and at the same time, the mobile terminal plays the audio of the A song.

Further, in order to enable, when the mobile terminal plays the first audio, no sound is generated in the current environment. The amplitude corresponding to the first audio when being played by the mobile terminal is 0. That is to say, the mobile terminal playing the first audio is actually playing the first audio in a simulation manner, and the mobile terminal actually plays an audio of the first audio processed with the amplitude of 0, so as to achieve the purpose that the amplitude corresponding to the first audio when being played by the mobile terminal is 0.

It can be understood that, in the current application scenario, the user needs the vehicle terminal to play the sound. Therefore, an audio actually played by the vehicle terminal is the first audio, and an amplitude of the first audio is not zero.

Step S102: obtaining a recorded audio of a current environment, where the recorded audio includes the first audio played by the vehicle terminal and a second audio for voice recognition.

Specifically, the mobile terminal can obtain the recorded audio of the current environment in real time.

As described in the above embodiment, the amplitude corresponding to the first audio played by the mobile terminal is 0, and the amplitude corresponding to the first audio played by the vehicle terminal is not 0. Therefore, the recorded audio of the current environment obtained by the mobile terminal may include the first audio played by the vehicle terminal. If the user is controlling an application by voice, the current environment includes the second audio for voice recognition. At this time, the recorded audio of the current environment obtained by the mobile terminal includes, in addition to the first audio played by the vehicle terminal, the second audio for voice recognition.

If a sound is generated in the current environment when the mobile terminal plays the first audio, the recorded audio of the current environment obtained by the mobile terminal further includes the first audio played by the mobile terminal, which complicates the processing of the recorded audio. Therefore, in step S101, it needs to render the amplitude corresponding to the first audio when being played by the mobile terminal to be 0.

Further, the mobile terminal can also control a volume corresponding to the first audio when being played by the mobile terminal to be 0.

Step S103: eliminating, according to the first audio played by the mobile terminal, the first audio played by the vehicle terminal in the recorded audio to obtain the second audio.

Specifically, since the mobile terminal and the vehicle terminal play the first audio synchronously, the mobile terminal can determine, according to the first audio played by the mobile terminal in the simulation manner, the first audio is being played by the vehicle terminal when the recorded audio of the current environment is obtained. In other words, when the recorded audio of the current environment is obtained, the first audio that the mobile terminal is playing in the simulation manner is the first audio that the vehicle terminal is playing.

Specifically, in an approach, eliminating, according to the first audio played by the mobile terminal, the first audio played by the vehicle terminal in the recorded audio of the current environment obtained by the mobile terminal to obtain the second audio includes:

b1, performing a resampling processing on the first audio played by the mobile terminal to obtain a third audio;

specifically, "the first audio played by the mobile terminal" herein is the first audio played by the mobile terminal when the recorded audio of the current environment is obtained.

The reason for performing the resampling processing on the first audio played by the mobile terminal is as follows:

due to the nature of a voice recognition module inside the mobile terminal, the voice recognition module may not be able to process the form of the first audio played by the mobile terminal. Therefore, the first audio played by the mobile terminal needs to be resampled to obtain the third audio. It can be understood that the third audio is an audio that matches the voice recognition module.

b2, eliminating, according to the third audio, the first audio played by the vehicle terminal in the recorded audio to obtain the second audio.

Specifically, the eliminating, according to the third audio, the first audio played by the vehicle terminal in the recorded audio to obtain the second audio may have the following two, but not limited to the following two, implementable implementations.

A first implementable implementation is that: the eliminating, according to the third audio, the first audio played by the vehicle terminal in the recorded audio to obtain the second audio includes: eliminating the first audio played by the vehicle terminal in the recorded audio of the current environment to obtain the second audio for voice recognition by taking the third audio as a reference audio.

That is, an echo eliminating algorithm is adopted to eliminate the first audio played by the vehicle terminal in the recorded audio of the current environment to obtain the second audio for voice recognition by taking the third audio as reference data. The echo eliminating algorithm is an existing algorithm and will not be described here.

A second implementable implementation is that: the eliminating, according to the first audio played by the mobile terminal, the first audio played by the vehicle terminal in the recorded audio to obtain the second audio includes:

performing a dual channel to single channel processing on the third audio to obtain a fourth audio; and eliminating, according to the fourth audio, the first audio played by the vehicle terminal in the recorded audio of the current environment to obtain the second audio for voice recognition.

That is, the echo eliminating algorithm is adopted at this time to eliminate the first audio played by the vehicle terminal in the recorded audio of the current environment to obtain the second audio for voice recognition by taking the fourth audio as reference data.

The second approach is applicable to a case where the third audio is dual channel data and a channel supported by the voice recognition module for eliminating the first audio played by the vehicle terminal in the recorded audio in the mobile terminal is a single channel.

Further, the recorded audio of the current environment is not obtained by the voice recognition module of the mobile terminal, and it needs a certain period of time to transmit the recorded audio of the current environment to the voice recognition module. The reference audio in the recorded audio of the current environment for elimination is also not obtained by the voice recognition module, and it also needs a certain period of time to transmit the reference audio to the voice recognition module. Therefore, the voice recognition module performs time calibration on the reference audio and the recorded audio of the current environment to ensure that the reference audio is the audio obtained by processing the first audio which is being played by the vehicle terminal, when the mobile terminal obtains the recorded audio of the current environment, that is, to ensure an accuracy of elimination.

In one approach, the processing of the voice recognition module performing the time calibration on the reference audio and the recorded audio of the current environment is as follows:

the voice recognition module obtains a first duration from a time when the mobile terminal obtains the recorded audio to a time when the voice recognition module receives the recorded audios, and obtains a second duration from a time when the mobile terminal obtains the recorded audio to a time when the voice recognition module receives the reference audio corresponding to the recorded audio;

the voice recognition module subtracts the second duration from the first duration to obtain a transmission delay duration; and the voice recognition module subtracts the transmission delay duration from the first duration to obtain a second time, and determines an audio received by the voice recognition module at the second time as the reference audio corresponding to the recorded audio, and a first time is a time when the voice recognition module receives the recorded audio.

Where the reference audio corresponding to the recorded audio is the third audio or the fourth audio described above.

In the present application, by playing the first audio synchronously by the mobile terminal and the vehicle terminal, the second audio for voice recognition can be obtained by eliminating, according to the first audio played by the mobile terminal, the first audio played by the vehicle terminal in the recorded audio, thereby improving the probability that the mobile terminal recognizes the voice of the user.

It should be understood that the serial numbers of the above processes, big or small, does not imply a sequence of executions, and an execution sequence of the processes should be determined by their function and internal logics, and should not be construed as limiting the implementation process of the embodiments of the present application.

FIG. 3 is a first schematic structural diagram of an audio processing apparatus according to an embodiment of the present application. The audio processing apparatus and a vehicle terminal are in a connected state. As shown in FIG. 3, the apparatus in this embodiment may include: a playing module 31, an obtaining module 32, and an eliminating module 33;

the playing module 31 is configured to play a first audio synchronously with the vehicle terminal, where an amplitude corresponding to the first audio when being played by the audio processing apparatus is 0;

the obtaining module 32 is configured to obtain a recorded audio of a current environment, where the recorded audio includes the first audio played by the vehicle terminal and a second audio for voice recognition; and the eliminating module 33 is configured to eliminate, according to the first audio played by the audio processing apparatus, the first audio played by the vehicle terminal in the recorded audio to obtain the second audio.

In a possible design, the eliminating module 33 is specifically configured to:

perform a resampling processing on the first audio played by the audio processing apparatus to obtain a third audio; and eliminate, according to the third audio, the first audio played by the vehicle terminal in the recorded audio to obtain the second audio.

In a possible design, the eliminating module 33 is specifically configured to:

eliminate the first audio played by the vehicle terminal in the recorded audio to obtain the second audio by taking the third audio as a reference audio.

In a possible design, the eliminating module 33 is specifically configured to:

perform a dual channel to single channel processing on the third audio to obtain a fourth audio; and eliminate, according to the fourth audio, the first audio played by the vehicle terminal in the recorded audio to obtain the second audio.

In a possible design, the eliminating module 33 is specifically configured to:

eliminate the first audio played by the vehicle terminal in the recorded audio to obtain the second audio by taking the fourth audio as a reference audio.

The apparatus in this embodiment may be used to perform the technical solution of the above method embodiment, and the implementation principles and the technical effects thereof are similar, and details are not described herein again.

Figure 4:
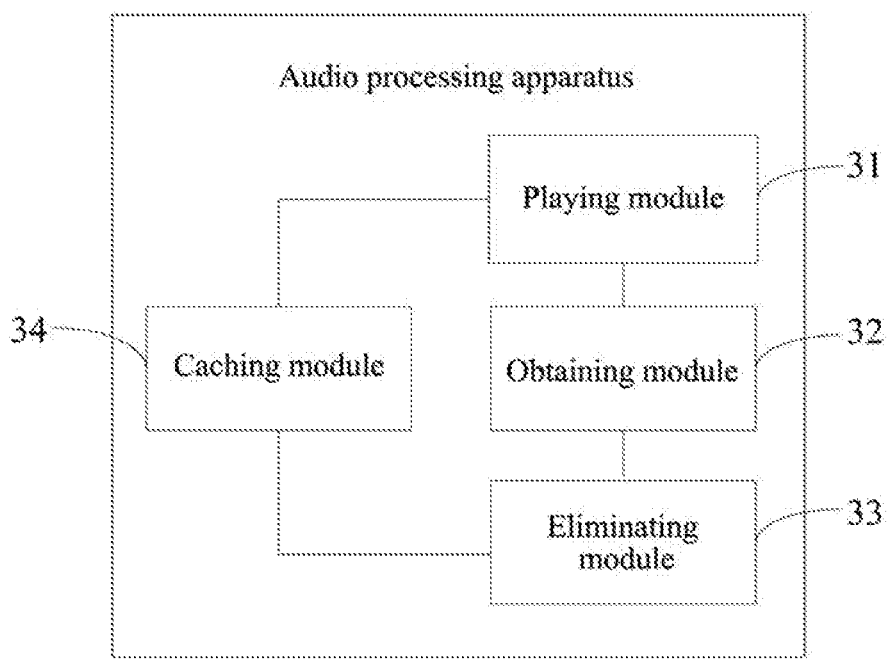
FIG. 4 is a second schematic structural diagram of an audio processing apparatus according to an embodiment of the present application.

FIG. 4 is a second schematic structural diagram of an audio processing apparatus according to an embodiment of the present application. As shown in FIG. 4, the apparatus in this embodiment, on the basis of the structure of the apparatus shown in FIG. 3, further includes: a caching module 34;

the caching module 34 is configured to cache the first audio locally before playing the first audio synchronously with the vehicle terminal.

The apparatus in this embodiment may be used to perform the technical solution of the above method embodiment, and the implementation principles and the technical effects thereof are similar, and details are not described herein again.

Figure 5:
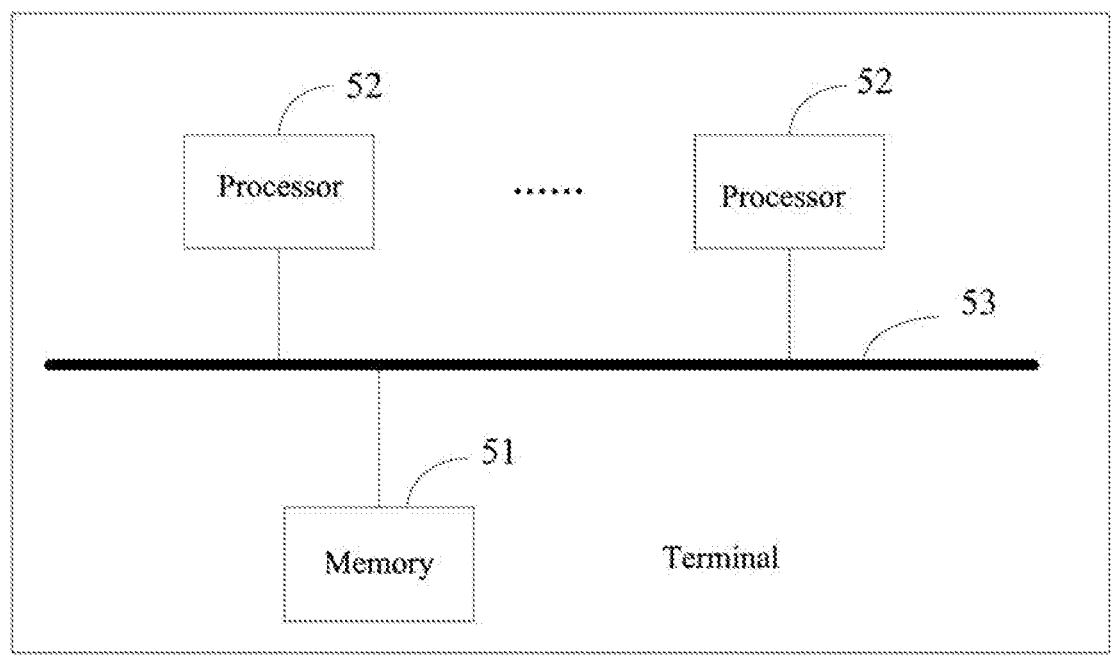
FIG. 5 is a schematic structural diagram of a terminal according to an embodiment of the present application.

FIG. 5 is a schematic structural diagram of a terminal according to an embodiment of the present disclosure. Referring to FIG. 5, the terminal of this embodiment includes: a processor 51, a memory 52, and a communication bus 53. The communication bus 53 is configured to connect the processor 51 and the memory 52, and the processor 51 is coupled to the memory 52;

the memory 51 is configured to store a computer program; and the processor 52 is configured to invoke the computer program stored in the memory to implement the method in the above method embodiments.

The computer program can also be stored in a memory external to the terminal.

It should be understood that, in the embodiment of the present application, the processor 52 may be a central processing unit (CPU), and the processor 52 may also be other general purpose processor, a digital signal processor (DSP), an application specific integrated circuit (ASIC), a field programmable gate array (FPGA) or other programmable logic devices, a discrete gate or a transistor logic device, a discrete hardware component, and the like. The general purpose processor can be a microprocessor or any conventional processor, and the like.

The memory 51 may include a read-only memory and a random access memory, and provides instructions and data to the processor 52. The memory 51 may also include a non-volatile random access memory. For example, the memory 51 can also store information of the device type.

The memory 51 can be either a volatile memory or a non-volatile memory, or can include both the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory can be a random access memory (RAM) that acts as an external cache. By way of an example but not a restrictive illustration, many forms of RAM are available, such as static RAM (SRAM), dynamic RAM (DRAM), synchronous DRAM (SDRAM), double data date SDRAM (DDR SDRAM), enhanced SDRAM (ESDRAM), synchlink DRAM (SLDRAM) and direct rambus RAM (DR RAM).

The bus 53 may include a power bus, a control bus, a status signal bus, and the like in addition to a data bus. However, for the sake of clarity, various buses are labeled as the bus 53 in the figure.

An embodiment of the present application provides a readable storage medium including a program or an instruction, where the methods in the above method embodiments is executed when the program or the instruction is operated on a computer.

Those skilled in the art t will appreciate that all or part of the steps to implement the various method embodiments described above may be accomplished by hardware associated with the program instructions. The foregoing program can be stored in a computer readable storage medium. The program, when executed, performs the steps including the above method embodiments; and the foregoing storage medium includes various media which can store a program code, such as a ROM, a RAM, a magnetic disk, or an optical disk.

Finally, it should be noted that the above embodiments are merely intended for illustrating the technical solutions of the present application, but not for limiting thereto; although the present application is illustrated in detail with reference to the foregoing embodiments, those skilled in the art should understand that they may still make modifications to the technical solutions described in the foregoing embodiments or make equivalent substitutions to part or all technical features thereof, however, these modifications or substitutions do not make the essence of the corresponding technical solutions depart from the scope of the solutions of the embodiments of the present application.

What is claimed is:

1. An audio processing method, wherein a mobile terminal and a vehicle terminal are in a connected state, the method is applied to the mobile terminal, and the method comprises: playing a first audio synchronously with the vehicle terminal, wherein an amplitude corresponding to the first audio when being played by the mobile terminal is 0; obtaining a recorded audio of a current environment, wherein the recorded audio comprises the first audio played by the vehicle terminal and a second audio for voice recognition; and eliminating, according to the first audio played by the mobile terminal, the first audio played by the vehicle terminal in the recorded audio to obtain the second audio; wherein the eliminating, according to the first audio played by the mobile terminal, the first audio played by the vehicle terminal in the recorded audio to obtain the second audio comprises: performing a resampling processing on the first audio played by the mobile terminal to obtain a third audio; performing a dual channel to single channel processing on the third audio to obtain a fourth audio, wherein the third audio is dual channel data, and the fourth audio is single channel data; and eliminating the first audio played by the vehicle terminal in the recorded audio to obtain the second audio by taking the fourth audio as a reference audio; wherein performing time calibration on the reference audio and the recorded audio comprises: obtaining a first duration from a time when the mobile terminal obtains the recorded audio to a time when a voice recognition module of the mobile terminal receives the recorded audio, and obtaining a second duration from a time when the mobile terminal obtains the recorded audio to a time when the voice recognition module receives the reference audio corresponding to the recorded audio; subtracting the second duration from the first duration to obtain a transmission delay duration; and subtracting the transmission delay duration from a first time to obtain a second time, and determining an audio received by the voice recognition module at the second time as the reference audio corresponding to the recorded audio, wherein the first time is a time when the voice recognition module receives the recorded audio.

2. The method according to claim 1, wherein the method further comprises:
    caching the first audio locally before playing the first audio synchronously with the vehicle terminal.

3. An audio processing apparatus, wherein the audio processing apparatus and a vehicle terminal are in a connected state, and the apparatus comprises: a processor coupled to a memory; the memory is configured to store a computer program; and the processor is configured to invoke the computer program stored in the memory, which, when executed by the processor, causes the processor to: play a first audio synchronously with the vehicle terminal, wherein an amplitude corresponding to the first audio when being played by the audio processing apparatus is 0; obtain a recorded audio of a current environment, wherein the recorded audio comprises the first audio played by the vehicle terminal and a second audio for voice recognition; and eliminate, according to the first audio played by the audio processing apparatus, the first audio played by the vehicle terminal in the recorded audio to obtain the second audio; wherein the computer program further causes the processor to: perform a resampling processing on the first audio played by the audio processing apparatus to obtain a third audio; perform a dual channel to single channel processing on the third audio to obtain a fourth audio, wherein the third audio is dual channel data, and the fourth audio is single channel data; and eliminate the first audio played by the vehicle terminal in the recorded audio to obtain the second audio by taking the fourth audio as a reference audio; wherein the computer program further causes the processor to: obtain a first duration from a time when the mobile terminal obtains the recorded audio to a time when a voice recognition module receives the recorded audio, and obtain a second duration from a time when the mobile terminal obtains the recorded audio to a time when the voice recognition module receives the reference audio corresponding to the recorded audio; subtract the second duration from the first duration to obtain a transmission delay duration; and subtract the transmission delay duration from a first time to obtain a second time, and determine an audio received by the voice recognition module at the second time as the reference audio corresponding to the recorded audio, wherein the first time is a time when the voice recognition module receives the recorded audio.

4. The apparatus according to claim 3, the computer program further causes the processor to:
    cache the first audio locally before playing the first audio synchronously with the vehicle terminal.

5. A nonvolatile memory, wherein the nonvolatile memory has stored thereon a program or an instruction, wherein the method of claim 1 is executed when the program or the instruction is operated on a computer.

\* \* \* \* \*